Patented Dec. 20, 1949

2,491,487

UNITED STATES PATENT OFFICE 2,491,487

PROCESS OF MAKING WATER-IMPERVIOUS CONCRETE

Roy C. Faulwetter, Milwaukee, Wis.

No Drawing. Application July 9, 1945,
Serial No. 604,095

7 Claims. (Cl. 117—65)

This invention appertains to concrete, mortar, and terrazzo mixtures and more particularly to a novel composition and process of producing a novel composition for a variety of different uses, such as floors, pavements, roads, airfield runways, ornamental structures, wallboard, artificial stone, etc.

One of the primary objects of my invention is to provide a composition which can be made permanently impervious to the absorption of water or water vapor after the initial concrete or like mixture has become set or hardened.

Another salient object of my invention is to provide a composition embodying a cement binder, sand and aggregates commonly used in the preparation of concrete, terrazzo and mortar and an inert substance and then mixing said composition with water and placing the same in forms or applying the same to floors, pavements, roads, airfield runways, ornamental structures, wallboard, artificial stone, etc. as the case may be for hardening or setting and thereafter applying a suitable solvent for the inert substance to the surface of the hardened mixture and thereby causing the inert substance to permeate and diffuse completely throughout the pores, crevices, fissures, bubbles and all existing voids and spaces within the hardened mass and between the various materials comprising the same whereby to bring about the permanently sealing of such voids and spaces to the penetration or absorption of water or water vapor. Portable objects made by this process may be immersed for predetermined period of penetration, in such a solvent, then lifted for drainage and drying.

A further object of my invention is to provide a concrete or like material which will be comparatively inexpensive to mix and lay, one which can be handled by the ordinary workman, and one which will possess the desired qualities of withstanding traffic and having somewhat the appearance of being resilient and warm, and one which can be effectively polished or ground to a smooth finish by an ordinary sand or like abrasive polishing machine.

With these and other objects in view, the invention consists in the combining of certain materials and process of forming a concrete or like article from such materials.

In accordance with my process, I employ with the usual materials used in forming concrete, terrazzo or mortar, namely a cement binder, sand, and aggregates, an inert substance such as a water insoluble resin.

The cement binder referred to can be an inorganic settable ingredient such as a hydraulic, Portland, natural or aluminous cement; or a gypsum, a plaster of Paris, calcium sulphate, lime, or a similar calcium binder; or a magnesium oxychloride or other magnesium or magnesite or oxysalt composition; or any other chemically "settable" inorganic substance similar to those set out above which may serve as a suitable binder.

The aggregate used can be stone, gravel, pebbles, marble chips, sawdust, cinders, asbestos, mica, talc, flint, or manufactured particles such as powdered ceramic material; or any other particles which serve as an extender, a diluent or filler, regardless of size of such particles.

With this concrete, mortar or terrazzo mixture, is incorporated a desired powdered dry inert material or plastic resin. The desired amount of water is added to the mixture so that the mixture can be spread on a surface or cast into suitable forms. At this point, it is to be noted that while the inert material or resin is distributed throughout the entire mixture, the same does not become diffused until the mixture has set or hardened and then is treated with a certain chemical or chemical compound.

The inert material used can be either a synthetic plastic resin, natural rosin, wax or gum; all in a dry powdered form.

By the term synthetic resin is meant that group of organic and/or silicone chemical substances which may be manufactured by a combination or synthesis of previously manufactured substances and which products may be procured in dry, water insoluble, minutely powdered, flaked or granular form, and which will remain inert when mixed with the concrete, mortar or terrazzo mixture as brought out above. As examples of the type of synthetic resin used, the following can be mentioned:

Vinyl esters and copolymers, polyterpene hydrocarbon resins, organo-silicon polymers, cellulose organic and inorganic esters, ethyl-cellulose ethers, and the like.

The natural rosin, wax or gum, is meant to include the entire group of soluble (in suitable solvent for each separate substance) products of nature, such as pine rosin, chicle, mastic, balsam gum, carnauba wax procured from secretions, exudates, sap or distillation of vegetable materials, and also lac, beeswax, gelatin procured from animal matter, or pitch, cumarone-indene resins, etc. obtained from petroleum, asphalt and other minerals.

After the concrete, mortar or terrazzo mixture and inert material has been thoroughly comingled and mixed with the desired amount of water, the same is then poured into forms or laid on a surface and then troweled or spread to form a plane face. When the mass has hardened, (i. e., when chemical hydration has occurred and a large percentage of the residual water has evaporated) then the same is thoroughly wet with a penetrating material or materials, later called solvent and/or plasticizer, which will dissolve the plastic resin or inert material to cause the latter to diffuse and permeate throughout all the openings, voids and fissures within the hardened mass. This is accomplished either by pouring the material upon the hardened floor, pavement, or runway, or by immersing portable products in such material.

The set concrete is treated with the solvent and/or solvent-type plasticizer for the particular kind of resinous material used until the resinous material enters into solution throughout the concrete mass to eliminate voids therein.

This also permits the plastic solution to spread over the surface of the hardened mass, thus producing a smooth velvety surface.

This treatment with the solvent and/or plasticizer permits the latter to penetrate the mass "concrete" and wet the inert plastic resin or natural rosin, gum or wax which has been introduced with the cement itself, and which up to this point has remained as an inert element in the mixing and setting of the concrete. Upon contact of the solvent and/or plasticizer, the resin particles become wet, swell and enter the earlier stages of solution. This dissolving process continues so long as the solvent and/or plasticizer remains in contact with the resin, and the resultant solution eventually diffuses throughout any voids, however minute or microscopic they may be.

As an example of the chemical used, the following can be mentioned:

"Di-2-ethylhexyl phthalate, dioctyl phthalate," "polyethylene glycol di-2-ethylhexoate," "tricresyl phosphate" "ethylhexyl phthalate," or the like, preferably such as possess very slow evaporation rates under normal conditions and are least soluble "in water" or "water in."

These three substances function as plasticizers as well as solvents for the plastic material preferred in the formulas below.

The amount of solvent and/or plasticizer required is determined by the rate of and volume of the absorption thereof.

In order to accelerate penetration, the plasticizers may be diluted with either true solvents for the synthetic resins used, such as "methyl isobutyl ketone," "methyl ethyl ketone" and the like for the vinyl and certain other resins, various acetic acid esters for cellulose derivatives; benzene, naptha, turpentine, for the natural rosins, gums and waxes.

As a diluent, and at the same time increasing penetrating properties, the plasticizers such as "tricresyl phosphate," etc., may be combined with a modified aromatic naptha.

The following proportions of materials have been found advantageous for typical terrazzo type mixture, which may be sanded or rubbed and polished with abrasive paper or cloth applied dry to expose the particular aggregate used and render an exceptionally smooth surface:

|  | Pounds |
|---|---|
| Aggregates (dolomite, screened to pass 4 mesh and retained on 10 mesh sieves) | 167 |
| Vinyl acetate-chloride copolymer | 7.5 |
| Portland cement | 94 |
| Gaging water (4½ gal. per sack) | 37.3 |

After the solvent has been applied to the hardened mass, the mass is left for a short length of time, after which the surface can be polished or smoothed by abrasive paper or cloth to bring to view the particular type of aggregate used.

A sulphonated wetting and dispersing agent can be used in the above mixture to increase dispersion of the cement particles and to improve hydration of all of the cement with minimum workable water cement ratio.

Below is a desirable formula in which a sulphonated wetting and dispersing agent is used:

|  | Pounds |
|---|---|
| Aggregates (dolomite screened to pass 4 mesh and retained on 10 mesh sieve) | 177 |
| Vinyl acetate-chloride copolymer | 3.5 |
| A sulphonated wetting and dispersing agent | 1 |
| Water | 37.3 |

When this mixture has been laid, the same is preferably treated with a solvent consisting of polyethylene glycol di-2-ethylhexoate 4 parts by volume and naptha 1 part by volume.

Any preferred wetting agent may be added in minute amounts to the gaging water in order to increase hydration and flocculation of the cement particles in lieu of the sulphonated wetting and dispersing agent mentioned above; or a wetting agent in dry form may be added to the dry cement and aggregate mixture to accomplish the same result.

It shall be a definite part of these formulations to incorporate the very smallest amount of gaging water possible for satisfactory spreading, screeding or molding of the cement-aggregate mixture in order to limit the amount of excess (over actual amount required for complete hydration and chemical reactions while setting). This is to prevent as much setting or "initial" shrinkage and to reduce the amount of contained or entrained air in the hardened mixture.

In the above formula, crushed marble or granite chips may be used in place of the dolomite mentioned in order to obtain the distinctive color combinations recognized in such terrazzo surfaces.

Another variation of the above would be to use aggregate material of finer screening such as would pass 10 mesh and be retained on 35 mesh sieves, with other ingredients remaining approximately the same. Such a mixture would supply greater tensile strength in relation to thickness of the mass and greater cross-shear or load bearing strength when spread in a relatively thin floor or pavement topping.

A typical formula for use as a "topping" for a pavement, road or air field runway would be as follows:

Screened sand, 2½ to 3 parts by volume
Portland cement, 1 part by volume
Vinyl acetate-chloride copolymer, 3¾ to 10% by weight of cement used
A sulphinated wetting and dispersing agent, 1% by weight of cement used
Water, 4½ gallons per sack of cement, including moisture in sand used.

After setting and drying, the surface to be flooded with solvent and/or plasticizer, with or without addition of penetrating diluent.

Same alternatives to secure more complete hydration and flocculation of the cement particles may be used as mentioned above.

In general it may be said that the proportion of the plastic resin, natural rosin, gum or wax to be added to the dry ingredients of the concrete, mortar or terrazzo mixture shall be in relation to the amount of cement or cementing substance and to the normal porosity of the hardened mass after the addition of water and resulting setting obtained of the same.

While I have gone into some detail, it is to be understood that I do not wish to limit myself to the exact proportions of the materials listed above or to the exact materials or chemicals used, and that, obviously, equivalents of such materials can be used without departing from the spirit or the scope of my invention, but what I claim as new is:

1. The process that includes the addition of dry solid particles of water insoluble but otherwise soluble resinous material in a concrete mixture which comprises hydraulic cement, stone particles and water, said resinous material being in the proportion of 3¾ to 10% by weight of the hydraulic cement used, said resinous material being inert relative to the hydraulic cement, allowing the mixture to set and harden and then contacting the surface of the set concrete with a solvent for said resinous material and continuing said contact until the resinous material has entered into solution and until the voids in said concrete have been filled, and finally allowing the solvent to evaporate to solidify the resinous material.

2. The process that includes the addition of dry solid particles of water-insoluble but otherwise soluble resinous material in a concrete mixture which comprises hydraulic cement, stone particles and water; said resinous material being in the proportion of 3¾ to 10% by weight of the hydraulic cement used, said resinous material being inert relative to the hydraulic cement, allowing the mixture to set and harden and then contacting the surface of the set concrete with a solvent-type plasticizer for said resinous material and continuing said contact until the solvent-type plasticizer permeates the concrete mass and until the resinous material has entered into solution and until the voids in said concrete have been filled, and finally allowing the solvent-type plasticizer to evaporate to solidify the resinous material.

3. The process that includes the addition of dry solid particles of water-insoluble but otherwise soluble resinous material in a concrete mixture which comprises hydraulic cement, stone particles and water; said resinous material being in the proportion of 3¾ to 10% by weight of the hydraulic cement used, said resinous material being inert relative to the hydraulic cement, allowing the mixture to set and harden and then contacting the set mixture with a solvent and a solvent-type plasticizer for said resinous material, and continuing said contact until the resinous material has entered into solution and until the voids in said concrete have been filled, and finally allowing the solvent and the solvent-type plasticizer to evaporate to solidify the resinous material.

4. The process that includes the addition of dry solid particles of resinous material, namely, vinyl acetate-vinyl chloride copolymer in a concrete mixture which comprises hydraulic cement, stone particles and water; said vinyl acetate-vinyl chloride copolymer being in the proportion of 3¾ to 10% by weight of the cement used, said copolymer resin being inert relative to the hydraulic cement, allowing the mixture to set and harden and then contacting the surface of the set concrete with a solvent for said copolymer resin and continuing said contact until the copolymer resin has entered into solution and until the voids in said concrete have been filled, and finally allowing the solvent to evaporate to solidify the resinous material.

5. The process that includes the addition of dry solid particles of resinous material, namely, vinyl acetate-vinyl chloride copolymer in a concrete mixture which comprises hydraulic cement, stone particles and water; said vinyl acetate-vinyl chloride copolymer being in the proportion of 3¾ to 10% by weight of the cement used, said copolymer resin being inert relative to the hydraulic cement, allowing the mixture to set and harden, and then contacting the surface of the set concrete with methyl isobutyl ketone and continuing said contact until the copolymer resin has entered into solution and until the voids in said concrete have been filled, and finally allowing the methyl isobutyl ketone to evaporate to solidify the copolymer resin.

6. The process that includes the addition of dry solid particles of resinous material, namely, vinyl acetate-vinyl chloride copolymer in a concrete mixture which comprises hydraulic cement, stone particles and water; said vinyl acetate-vinyl chloride copolymer being in the proportion of 3¾ to 10% by weight of the cement used, said copolymer resin being inert relative to the hydraulic cement, allowing the mixture to set and harden and then contacting the surface of the set concrete with a solvent-type plasticizer such as polyethylene glycol di-2-ethylhexoate, and continuing said contact until the copolymer resin has entered into solution and until the voids in said concrete have been filled.

7. The process that includes the addition of dry solid particles of resinous material, namely, vinyl acetate-vinyl chloride copolymer in a concrete mixture which comprises hydraulic cement, stone particles and water; said vinyl acetate-vinyl chloride copolymer being in the proportion of 3¾ to 10% by weight of the cement used, said copolymer resin being inert relative to the hydraulic cement, allowing the mixture to set and harden, and then contacting the surface of the set concrete with a mixture of a solvent and a solvent-type plasticizer for said copolymer resin, namely, methyl isobutyl ketone and polyethylene glycol di-2-ethylhexoate, and continuing said contact until the copolymer resin has entered into solution and until the voids in said concrete have been filled, and finally allowing the solvent to evaporate.

ROY C. FAULWETTER.

REFERENCES CITED

The following references are of record in the file of this patent:

UNITED STATES PATENTS

| Number | Name | Date |
| --- | --- | --- |
| 1,034,324 | Thoma | July 30, 1912 |
| 1,331,217 | Schutte | Feb. 17, 1920 |
| 1,521,813 | Hornstein | Jan. 6, 1925 |
| 2,040,320 | Lovell | May 12, 1936 |

FOREIGN PATENTS

| Number | Country | Date |
| --- | --- | --- |
| 124,669 | Great Britain | 1919 |
| 202,785 | Switzerland | 1939 |
| 682,857 | Germany | 1939 |